G. L. NEWTON.
PEANUT HARVESTER.
APPLICATION FILED JUNE 18, 1918.

1,293,170.

Patented Feb. 4, 1919.
2 SHEETS—SHEET 1.

WITNESSES
Howard D. Ort.
H. T. Chapman.

George L. Newton, INVENTOR,

BY E. G. Siggers.

ATTORNEY

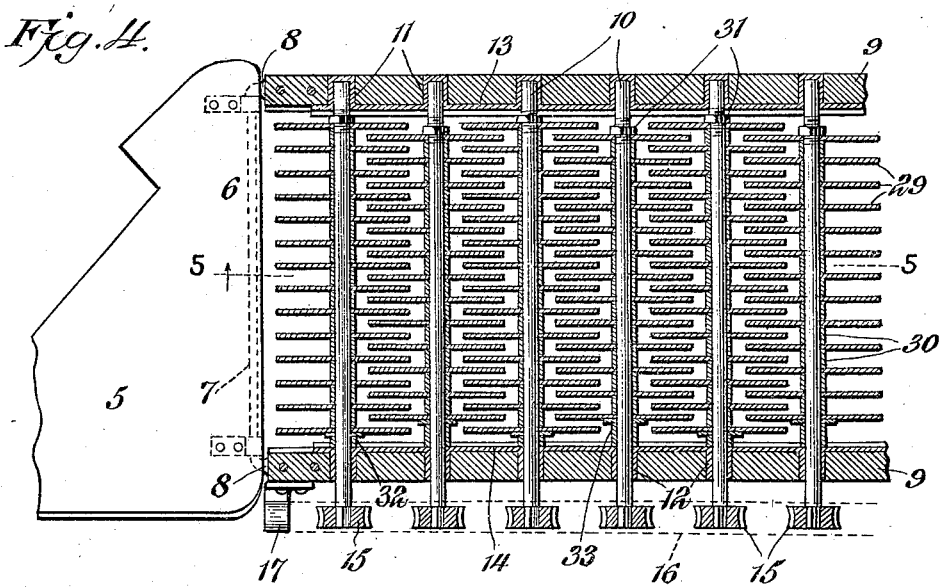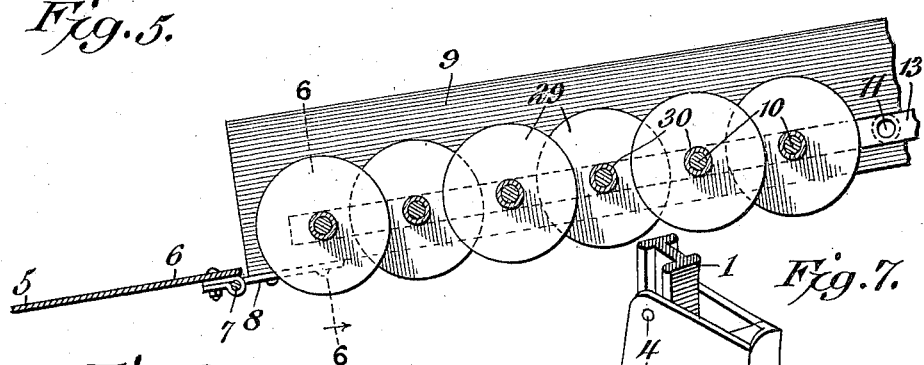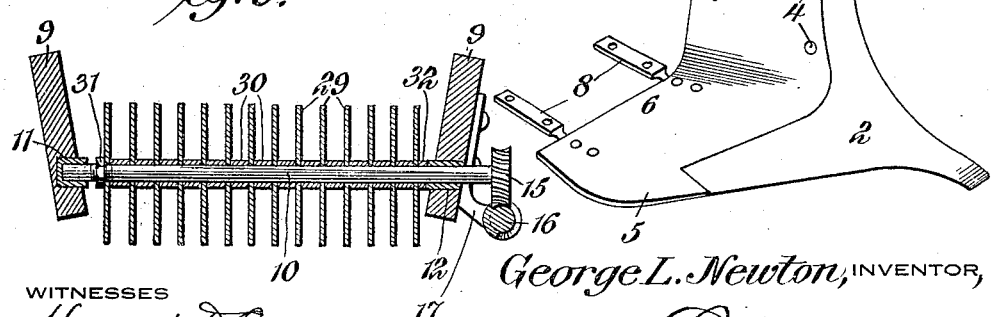

UNITED STATES PATENT OFFICE.

GEORGE LESTER NEWTON, OF MACHEN, GEORGIA.

PEANUT-HARVESTER.

1,293,170.  Specification of Letters Patent.  Patented Feb. 4, 1919.

Application filed June 18, 1918. Serial No. 240,656.

*To all whom it may concern:*

Be it known that I, GEORGE L. NEWTON, a citizen of the United States, residing at Machen, in the county of Jasper and State of Georgia, have invented a new and useful Peanut-Harvester, of which the following is a specification.

This invention has reference to peanut harvesters, and its object is to provide a simple structure for the purpose whereby peanuts may be harvested more expeditiously than before and without waste of peanuts.

In accordance with the invention there is provided a plow-like arrangement with guiding and controlling handles and so constructed that the peanuts lifted by the plow are delivered upon a series of intermeshing revolving disks located between side boards in such manner that the peanuts and attached vines are caused to pass to the rear end of the structure to be there dumped, and in the course of travel the disks loosen adherent dirt. Driving means for the disks are arranged to cause the latter to rotate rapidly with respect to the speed of travel of the plow, a traction wheel engaging the ground being connected to the disks to drive them.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 4 is a section on the line 4—4 of Fig. 1, but drawn on a larger scale.

Fig. 5 is a section on the line 5—5 of Fig. 4.

Fig. 6 is a section on the line 6—6 of Fig. 5, but omitting distant parts.

Fig. 7 is a perspective view of the plow point and share assembled.

Figure 1:
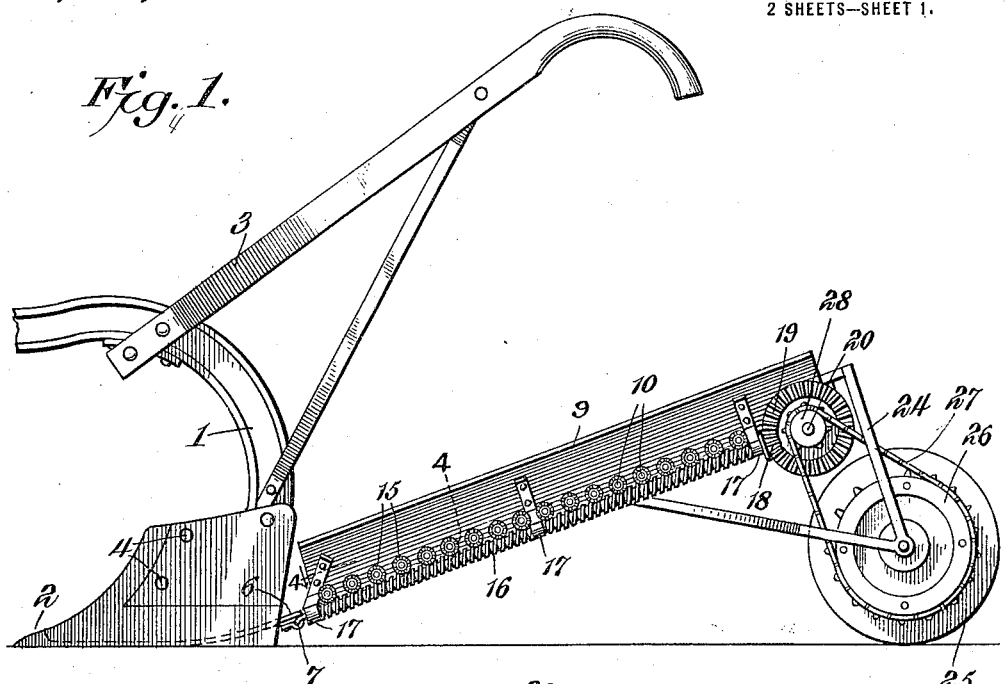
Figure 1 is a side elevation of a peanut harvester embodying the invention, with the plow beam broken away.
Figure 2:
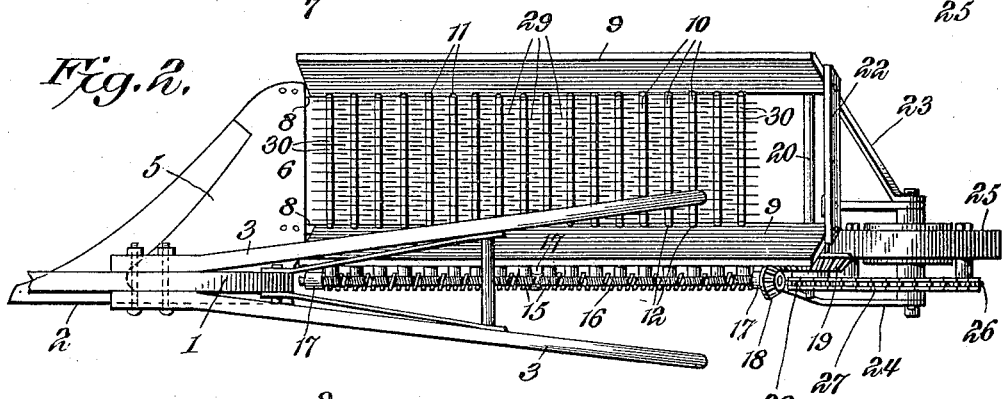
Fig. 2 is a plan view of the structure shown in Fig. 1.
Figure 3:
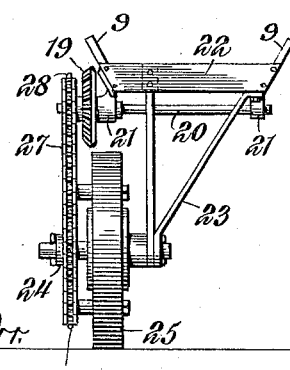
Fig. 3 is a rear elevation of the structure shown in Fig. 1, but omitting distant parts.

Referring to the drawings, there is shown a plow beam 1 and plow point 2, together with handles 3, all of which may be of known construction and need no special description. Fast to the plow point 2 and beam 1 by bolts 4 or in other appropriate manner is a moldboard 5 differing from an ordinary moldboard in that it has a rear plane portion 6, substantially triangular in form, the horizontal part of which forms a platform arranged to receive the peanuts and vines, lifted by the plow point, in a manner to deliver them upon a conveyer structure to be described.

Fast to the rear end of the plane portion of the moldboard 5 is a yoke bar 7 having end portions 8 bolted to the under edges of upstanding side boards 9. These boards flare upwardly so as to constitute the sides of a trough and the trough rises from the front end toward the rear end, the plane portion 6 delivering into the lower end of the trough. The bottom of the trough is composed of a series of shafts 10 journaled at the ends in bearings 11, 12 respectively. The bearings 11 are shown as of socket form and the bearings 12 as through bearings. The bearings 11 are carried by a bar 13 fast to the corresponding side board 9 and the bearings 12 are fast to a bar or strip 14 fast to the corresponding side board 9. The shafts extend through and beyond the bearings 12 and there each carries a worm gear 15, these gears being all engaged by a common worm shaft 16 mounted in journal brackets 17 fast to the neighboring side board 9. The shaft 16 extends from the lower end of the trough to near the upper end thereof and at the last named point carries a bevel pinion 18 with which meshes a bevel gear wheel 19 mounted on a shaft 20 journaled in bearings 21 on the upper ends of the respective boards 9, these boards being held in spaced relation at their upper ends by a cross piece 22.

Mounted in suitable brackets 23, 24 at the upper end of the trough is the axle of a traction wheel 25 carrying a sprocket wheel 26 connected by a sprocket chain 27 to a sprocket pinion 28 fast to the bevel gear wheel 19 either directly or through the shaft 20.

The shafts 10 each carry a series of plain flat disks 29 held apart by spacers 30 and all clamped together by a clamp nut 31 on each shaft 10. By employing spacers 32, 33 of different lengths at the ends of adjacent shafts 10 the disks 29, which may be all of like diameter and thickness, are interspersed with the radius of each disk nearly equal to the spacing of the shafts so that the disks overlap, but they do not touch. The disks when assembled form a sieve of which the sustaining members are continually rotated as the machine progresses, the shaft 16 being propelled by its connection with the traction wheel 25 and all the shafts 10 being propelled by the worm shaft 16 and worm pinions 15. By properly proportioning the parts, the disks may be caused to rotate with considerably greater speed than the progress of the machine over the ground.

The machine is assumed to be drawn by suitable power, whether animal or mechanical, and as it progresses the peanuts are excavated by the plow and directed by the plow share 5 and its rear end member 6 onto the revolving disks 29 which rotate with considerable rapidity. The parts are so arranged that the tops of the disks rotate toward the upper end of the trough or conveyer, consequently propelling the vines and peanuts thereon toward the upper end of the trough, discharging all adherent dirt but without liability of disengaging the peanuts from the vines. The result is that the peanuts are deposited from the upper end of the harvester either on the ground or into a suitable receptacle in a clean condition ready for further treatment.

It will be noted that the width of the conveyer is substantially equal to the horizontal part of the plane portion of the plow; that it is connected to said plane portion and rises from the same in a longitudinal straight line at one side of the beam; that it is disposed at one side of the handles and extends a considerable distance beyond the latter; and that it is driven by a single trailing traction wheel which is located at the inner side of the conveyer and not only supports the conveyer at the high end, but serves as its sole driving means.

What is claimed is:—

1. A peanut harvester comprising a plow, an inclined conveyer attached to and rising from the plow and extending in rear of the same; said conveyer including a series of groups of spaced disks, with the disks of the different groups interspersing and constituting the sustaining surface of the conveyer, a single driving means constituting also the sustaining means for the high end of the conveyer operatively connected to the disks, and handles for guiding the harvester.

2. A peanut harvester comprising a plow including a beam, plowpoint and moldboard, an inclined conveyer attached to and rising from the moldboard, and extending in rear of the same, a single driving means for the conveyer including a traction wheel adapted to travel along the ground for sustaining the high end of the conveyer, and handles for guiding the conveyer, said handles being connected to the plow beam and arranged at one side of the conveyer, the latter being of a length to extend rearwardly beyond the handles.

3. A peanut harvester comprising a plow, including a beam, plowpoint and moldboard, an inclined conveyer attached to and rising from the moldboard and extending in a longitudinally straight line therefrom at one side of the beam, said conveyer including a series of groups of spaced disks, with the disks of the different groups interspersing and constituting the sustaining surface of the conveyer, a single driving means constituting also the sustaining means for the high end of the conveyer and connected to the disks, said driving means being located at the inner side of the conveyer, and handles for guiding the harvester, said handles being connected to the plow beam and arranged at one side of the conveyer, and the plow having its moldboard delivering onto the lower end of the conveyer.

4. A peanut harvester comprising a plow, guiding handles therefor, an inclined elevating conveyer rising from the plow at one side of the handles, a single traction wheel sustaining the high end of the conveyer, and connections between the traction wheel and the elevating elements of the conveyer for driving said elevating elements.

5. A peanut harvester comprising a plow, an elevating conveyer fast to and rising from the rear of the plow and in position to receive material from the plow, a series of transverse shafts at the bottom of the conveyer with each shaft provided with a series of spaced disks intermeshing with the disks of the neighboring shafts and each shaft having a worm pinion at one end, a longitudinal worm shaft arranged along the conveyer and engaging all the worm pinions, a traction wheel adapted to travel along the ground and solely sustaining the high end of the conveyer, and gearing connections between the traction wheel and the worm shaft.

6. A peanut harvester comprising a plow, an elevating conveyer fast to and rising from the rear of the plow and in position to receive material from the plow, a series of transverse shafts at the bottom of the conveyer with each shaft provided with a series of spaced disks intermeshing with the disks of the neighboring shafts and each shaft having a worm pinion at one end, a longitudinal worm shaft arranged along the conveyer and engaging all the worm pinions, a traction wheel adapted to travel along the ground and solely sustaining the high end of the conveyer, and gearing connections between the traction wheel and the worm shaft, said gearing connections being proportioned to drive the disks at a higher speed than the speed of travel of the harvester.

7. A peanut harvester comprising a plow having a plane portion at the rear arranged to receive the peanuts and vines lifted by the plow, a conveyer having a width substantially equal to the width of said plane portion and communicating with and rising from the same, a single traction wheel connected to the high end of the conveyer for supporting the same, and means for driving said conveyer from said traction wheel.

In testimony that I claim the foregoing as my own, I have hereto affixed my signature.

GEORGE LESTER NEWTON.

Copies of this patent may be obtained for five cents each, by addressing the "Commissioner of Patents, Washington, D. C."